A. R. JOHNSON.
HOSE CONNECTION.
APPLICATION FILED MAY 13, 1920.
1,410,405.
Patented Mar. 21, 1922.
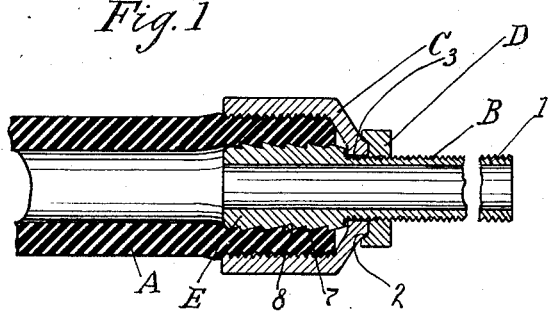
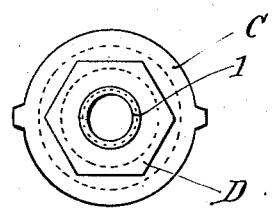
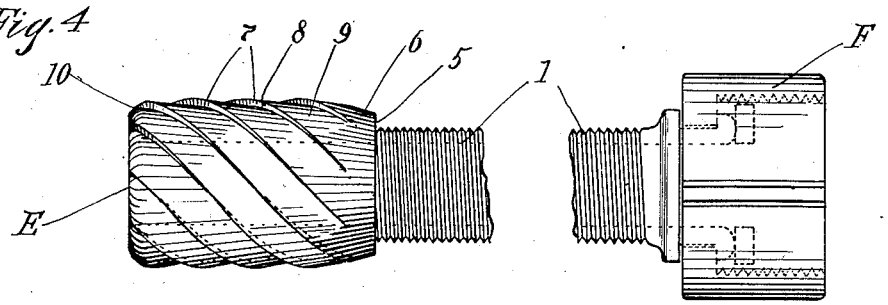
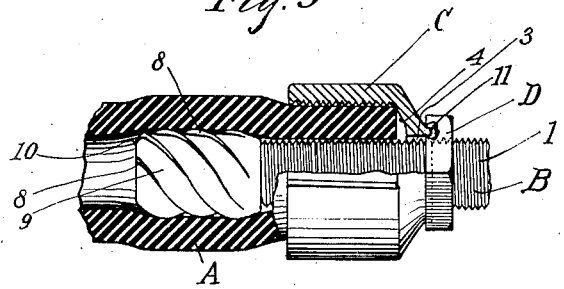
Inventor,
Anton R. Johnson
by A. S. Johnson
his Attorney.

UNITED STATES PATENT OFFICE.

ANTON R. JOHNSON, OF ST. PAUL PARK, MINNESOTA.

HOSE CONNECTION.

1,410,405. Specification of Letters Patent. Patented Mar. 21, 1922.

Application filed May 13, 1920. Serial No. 381,160.

*To all whom it may concern:*

Be it known that I ANTON R. JOHNSON, a citizen of the United States, residing at St. Paul Park, in the county of Washington, and State of Minnesota, have invented certain new and useful Improvements in Hose Connections, of which the following is a specification.

This invention relates to hose couplings and has for its object to provide certain novel features of construction by which a flexible pipe or hose can be attached to a metallic coupling member so as to produce a tight connection which will withstand high pressures without leaking. The invention may also be used for connecting pneumatic tools, requiring very high pressures, by means of hose with the air supply. It may also be used for many other purposes where extremely high pressures are used in flexible conduits. An object of the invention is to provide, in a device of the class described certain novel features of construction whereby the metallic coupling may be easily and quickly attached to the end of a hose, the forward end entering the interior of the hose being so formed as to require no great force in applying the same as well as avoiding laceration of the inside wall of the hose. Many devices now in use employ a nipple formed with a series of rings or corrugations or saw-tooth shoulders which must be literally forced into the mouth of the hose, thereby fracturing the inner soft rubber lining thereof.

Applicant's invention has for its object to provide an inner member which may be screwed into the opening of the hose, the thread being of very steep pitch and shaped like a saw-tooth directed toward the interior of the hose. A further object of the invention is to provide in a device of the class described an article for the purpose above named, wherein standard pipe caps and recessed nuts may be used.

To this end the invention consists of the features of construction, combination and arrangement of parts hereinafter described and claimed. In the drawings:

Figure 1 is a longitudinal section of the end of a hose showing the invention attached thereto.

Figure 2 is an end view of the same.

Figure 3 is a sectional view of the end of a hose showing the position the parts assume before the attachment thereof is completed, and Figure 4 is an enlarged side view of the hose expanding nipple portion of the invention showing one form of swivel coupling which may be used in connection therewith.

In the drawings A designates a flexible hose, B the nipple member of the invention, C the holding cap or sleeve and D the draw-nut or retaining nut movable on the nipple. The nipple which is formed of one piece comprises a major exteriorly threaded tubular portion 1, of uniform diameter around which the nut D threadedly fits so as to be screwed back and forth thereon. The nut is formed in one of its faces with a recess 2. The sleeve C is cylindrical in shape and interiorly formed with a thread of uniform diameter which is adapted to be screwed over the outside of the hose member A. At its forward end the sleeve has a central bore 3 to loosely receive the threaded nipple portion 1, the threaded portion being about the diameter of the interior of the hose. The sleeve shown in the drawings is coned at its forward end to form the angular wall 4, the hose member when finally positioned abutting thereagainst as shown in Figure 1. The nipple is formed with a hose expanding head E of uniform diameter somewhat larger than the outer diameter of the nipple so as to define a shoulder 5. At its nipple end the head is coned or beveled as at 6 whereby when the head is projected into the interior of the hose said bevel will facilitate withdrawing of the same. The circumferential surface of the head is formed with interspaced uniformly progressing spiral threads or ridges 7, the pitch thereof being comparatively steep. The threads are saw-tooth-like, each tooth having an approximately radially disposed abrupt face or shoulder 8 and a comparatively long slightly downwardly inclined straight upper side 9. whereby to facilitate moving of the head in the interior of the hose when the nipple is pulled outwardly away from the hose. The outer end of the head is rounded or beveled as at 10, the radial faces 8 of the respective teeth being continued around said rounded portion so as to facilitate inserting of said head into the mouth of the hose. Thus, when it is desired to project the nipple into the hose the rounded end 10 is gently forced into the mouth thereof and the nipple then pushed simultaneously forward and turned to the right causing the latter to very rapidly screw into the interior of the hose, the screw threads or shoulders 7 becoming imbedded in the soft wall of the hose and sliding therein without lacerating the same.

In operation (Figure 3) the nipple is entered into the rubber tube a considerable distance. The sleeve C is then cupped or telescoped over the end of the hose either loosely or if necessary gently screwed thereon, depending upon the size of the hose. The nipple shown in the drawings is about the diameter of the interior of the hose so that the hose is free from the threads on both the cap and the nipple. When thus positioned, the nut D is moved to bring its recess 2 over the circular ridge 11 surrounding the bore 3 of the cap, for the purpose of maintaining a central position for the nipple relative to the sleeve. The nut is now screwed on the nipple the former abutting against the sleeve, thereby drawing the head E through the interior of the hose into the position shown in Figure 1. The hose is thus compressed so as to fill the threads of the sleeve and the threads 7 of the head, a powerful outward pressure being exerted by the latter, whereby the connection is rendered air tight and firm against separation. The sleeve C is formed with suitable outer ribs whereby it may be conveniently turned with a wrench. In Figure 4 of the drawings is shown an ordinary swivel hose connection F whereby the nipple may be connected with a source of air supply.

I claim:

1. The means of coupling a flexible pipe of resilient material to a coupling member said coupling member having a nipple a part thereof being of uniform diameter and externally threaded, and the other part constituting one end thereof being formed with an enlarged cylindrical head, larger in diameter than the internal diameter of the flexible pipe, the circumferential surface thereof being formed with spaced relatively shallow spiral saw-tooth-like threads progressing uniformly and sloping toward the hose, and being of relatively steep pitch to permit said head to be screwed into the interior of the hose, to a position a distance from the end thereof, by a combined forward and turning movement of the hand, an internally threaded sleeve the threaded portion thereof of uniform diameter adapted to be telescopically slipped, so as to fit, over the end of the hose and to extend to a point adjacent said head, and a nut threaded on said nipple and abutting against said sleeve, whereby when said nut is screw fed in said nipple said head will be slid longitudinally in the interior of the hose into the interior of said sleeve, to press the resilient material of the hose conformingly over the threads of the sleeve.

2. A hose connection comprising a nipple having an externally threaded part of uniform diameter and having an enlarged cylindrical end formed with shallow spiral ridges of relatively large pitch, and of a diameter so as to be capable of being screwed into the interior of a hose to expand the latter diametrically, an internally threaded sleeve more or less loosely fitting over the end of the hose and centrally bored to loosely receive said externally threaded part, and a nut threaded on said externally threaded part to slide said nipple longitudinally of said hose toward said sleeve to crowd the wall of the hose against the latter, said ridges being formed with an upper side gradually sloping downwardly toward said externally threaded part for the purpose set forth.

3. A hose connection comprising an internally threaded sleeve having a bore of reduced diameter, concentric therewith, said sleeve being adapted to telescope loosely with its internally threaded part over the end of a hose, a one piece nipple having an enlarged cylindrical head of larger diameter than the interior of the hose extending loosely through said bore and being projectible frictionally with said head into the interior of the hose so that the head will be positioned bodily beyond the end of said sleeve, a nut threaded on said nipple and abutting said sleeve for sliding said head longitudinally in the hose, into said sleeve when said nut is turned upon the nipple.

4. A hose connection comprising a nipple having a reduced part of uniform diameter and a cylindrical head at one end larger in diameter than the internal diameter of the hose, said head being formed with a rounded end to facilitate forcing it into the interior of the hose to a position so that it will be bodily spaced from the end thereof, a sleeve loosely slidable over the part of uniform diameter of said nipple having an internally threaded part adapted to be slipped over that end of the hose between the latter and said head, and means operatively connected with the part of uniform diameter of said nipple and engaging with the outside of said sleeve for pulling on the hose in a direction toward the nipple and simultaneously sliding the head of the latter longitudinally in the interior of the hose to bring it bodily into the interior of said sleeve.

In testimony whereof I affix my signature.

ANTON R. JOHNSON.